(12) United States Patent
Huang et al.

(10) Patent No.: US 11,701,871 B2
(45) Date of Patent: Jul. 18, 2023

(54) EASY-TO-CLEAN PROTECTIVE FILM AND SUBSTRATE ASSEMBLY

(71) Applicant: 3M INNOVATIVE PROPERTIES COMPANY, St. Paul, MN (US)

(72) Inventors: Pei Huang, Shanghai (CN); Xue-hua Chen, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 130 days.

(21) Appl. No.: 16/961,320

(22) PCT Filed: Jan. 10, 2019

(86) PCT No.: PCT/IB2019/050200
§ 371 (c)(1),
(2) Date: Jul. 10, 2020

(87) PCT Pub. No.: WO2019/138357
PCT Pub. Date: Jul. 18, 2019

(65) Prior Publication Data
US 2021/0078312 A1 Mar. 18, 2021

(30) Foreign Application Priority Data

Jan. 10, 2018 (CN) .......................... 201820041055.0

(51) Int. Cl.
*B32B 27/14* (2006.01)
*B32B 5/16* (2006.01)
(Continued)

(52) U.S. Cl.
CPC ................ *B32B 27/14* (2013.01); *B32B 5/16* (2013.01); *B32B 7/06* (2013.01); *B32B 27/08* (2013.01);
(Continued)

(58) Field of Classification Search
CPC .. B32B 27/14; B32B 5/16; B32B 7/06; B32B 27/08; B32B 27/304; B32B 27/40;
(Continued)

(56) References Cited

U.S. PATENT DOCUMENTS 4,844,976 A 7/1989 Huang
5,346,755 A 9/1994 Morse
(Continued)

FOREIGN PATENT DOCUMENTS

CN 109307655 2/2019
JP 11286084 10/1999
(Continued)

OTHER PUBLICATIONS

Machine Translation of JP-2004292753-A. (Year: 2004).*
International Search Report for PCT International Application No. PCT/IB2019/050200, dated May 10, 2019, 3 pages.

*Primary Examiner* — Patricia L. Nordmeyer
(74) *Attorney, Agent, or Firm* — Vincent Pham

(57) ABSTRACT

The present utility model provides an easy-to-clean protective film, which belongs to the technical field of protective films for vehicles and other vehicles, and can solve the problems that lasting scratches are easily caused to the existing vehicle coatings and surface stains are not easy to clean. The easy-to-clean protective film provided by the present utility model comprises a polyvinyl chloride (PVC) bottom film and an easy-to-clean layer consisting of silicon dioxide particles, wherein the water contact angle of the easy-to-clean layer is small and thus the adhesive force of dust and oil stains can be reduced. After the surface of the easy-to-clean layer is contaminated by dust and oil stains, the dust and oil stains can be easily cleaned with a simple cleaning. The easy-to-clean protective film provided by the present utility model is suitable for use as protective coat-
(Continued)

ings of various substrates, especially for attachment to the body surfaces of vehicles such as automobiles.

12 Claims, 1 Drawing Sheet

(51) Int. Cl.
| | |
|---|---|
| B32B 27/08 | (2006.01) |
| B32B 27/30 | (2006.01) |
| B32B 27/40 | (2006.01) |
| C09J 7/38 | (2018.01) |
| C09J 7/40 | (2018.01) |
| C09J 7/24 | (2018.01) |
| B32B 7/06 | (2019.01) |
| C09J 7/29 | (2018.01) |

(52) U.S. Cl.
CPC ............ *B32B 27/304* (2013.01); *B32B 27/40* (2013.01); *C09J 7/245* (2018.01); *B32B 2255/20* (2013.01); *B32B 2307/732* (2013.01); *B32B 2307/748* (2013.01); *B32B 2405/00* (2013.01); *B32B 2605/00* (2013.01); *C09J 7/29* (2018.01); *C09J 7/38* (2018.01); *C09J 7/40* (2018.01); *C09J 2301/122* (2020.08); *C09J 2301/302* (2020.08); *Y10T 428/1471* (2015.01)

(58) Field of Classification Search
CPC .......... B32B 2255/20; B32B 2307/732; B32B 2307/748; B32B 2405/00; B32B 2605/00; B32B 2255/28; B32B 2307/406; B32B 2307/538; B32B 2250/02; B32B 2255/10; B32B 2255/26; B32B 2307/412; B32B 2307/73; B32B 2571/00; B32B 27/06; B32B 7/12; B32B 27/30; C09J 7/245; C09J 7/29; C09J 7/38; C09J 7/40; C09J 2301/122; C09J 2301/302; C09J 2427/006; Y10T 428/1471

See application file for complete search history.

(56) References Cited

U.S. PATENT DOCUMENTS

| | | |
|---|---|---|
| 7,235,305 B2 | 6/2007 | Hasskerl |
| 2002/0142150 A1 | 10/2002 | Baumann |
| 2003/0124301 A1 | 7/2003 | Oles |
| 2004/0265602 A1* | 12/2004 | Kobayashi .............. B32B 27/08 428/458 |
| 2005/0208269 A1 | 9/2005 | Nun |
| 2010/0004373 A1 | 1/2010 | Zhu |
| 2013/0059120 A1 | 3/2013 | Shi |
| 2015/0165476 A1* | 6/2015 | Kim ..................... B81C 1/0038 427/180 |

FOREIGN PATENT DOCUMENTS

| | | | |
|---|---|---|---|
| JP | 2004292753 A | * | 10/2004 |
| JP | 3651586 | | 3/2005 |
| JP | 2008-307763 | | 12/2008 |
| WO | WO 2003-013850 | | 2/2003 |

* cited by examiner

EASY-TO-CLEAN PROTECTIVE FILM AND SUBSTRATE ASSEMBLY

CROSS REFERENCE TO RELATED APPLICATIONS

This application is a national stage filing under 35 U.S.C. 371 of PCT/IB2019/050200, filed Jan. 10, 2019, which claims the benefit of China Application No. 2018200410550, filed Jan. 10, 2018, the disclosure of which is incorporated by reference in their entirety herein.

TECHNICAL FIELD

The present utility model belongs to the technical field of protective films for vehicles, in particular, to an easy-to-clean protective film and a substrate assembly.

BACKGROUND

Coatings for vehicles such as automobiles protect not only the metals of the body from corrosion, they also make the vehicles more presentable. The vast majority of vehicle coatings contain volatile organic compounds (VOC). In order to protect the environment, countries have introduced relevant regulations to control VOC emissions. Nevertheless, regular cleaning and maintenance need to be done on the vehicles to maintain the exterior gloss and cleanliness.

It is therefore necessary to have a protective film to replace the vehicle coating. Such a protective form should be able to meet the national requirements on VOC emission control, and protect the vehicles from the body corrosion at the same time. At present, protective films for vehicles, such as automobile protective films, are mainly applied to glass substrates. Research on easy-to-clean protective films for automobile body coatings is sparsely seen.

SUMMARY

The inventor find that at least the following problems exist in the prior art: on the one hand, dust, oil stains, or other heavy stains are difficult to be cleaned; on the other hand, if the stains are cleaned through physical rubbing, foreign particles will leave permanent scratches on the vehicle body as the vehicle cleaning frequency increases; and if the car body is cleaned by using a strong chemical cleaning agent, the exterior gloss of the vehicles is gradually flattened because of the chemical cleaning agent used during the cleaning process.

The present utility model provides an easy-to-clean protective film and a substrate assembly to solve the problems that the current vehicle coating is liable to permanent scratches and hard to clean.

In order to solve the technical problems, the present utility model adopts the following technical solution:

An easy-to-clean protective film, comprising a polyvinyl chloride (PVC) bottom film and an easy-to-clean layer consisting of silicon dioxide particles on a side of the PVC bottom film. Preferably, the polyvinyl chloride bottom film has a thickness of from 50 µm to 100 µm. Preferably, the easy-to-clean layer has a thickness of from 150 nm to 1 µm. Preferably, the silicon dioxide particle has a particle size of from 2 nm to 100 nm. Preferably, the silicon dioxide particle has a particle size of from 2 nm to 10 nm. Preferably, a bonding layer is further arranged between the polyvinyl chloride bottom film and the easy-to-clean layer, and the polyvinyl chloride bottom film and the easy-to-clean layer are bonded together through the bonding layer. Preferably, the bonding layer consists of polyurethane (PU). Preferably, the bonding layer has a thickness of from 5 µm to 75 µm. Preferably, a pressure-sensitive adhesive layer is arranged on a side, far away from the easy-to-clean layer, of the PVC bottom film. Preferably, a release layer is further arranged on a side, far away from the PVC bottom film, of the pressure-sensitive adhesive layer.

The present utility model further provides a substrate assembly, comprising a substrate having arranged thereon a coating layer formed through coating, wherein the easy-to-clean protective film mentioned above is attached to the coating layer.

The present utility model further provides a substrate assembly, comprising a substrate having the easy-to-clean protective film mentioned above attached thereon.

The easy-to-clean protective film provided by the present utility model comprises a PVC bottom film for protecting a metal coating and an easy-to-clean layer consisting of silicon dioxide particles. The water contact angle of the easy-to-clean layer is small and thus the adhesive force of dust and oil stains can be reduced. After the surface of the easy-to-clean layer is contaminated with dust and oil stains, the dust and oil stains can be easily cleaned with a simple cleaning. The easy-to-clean protective film provided by the present utility model is suitable for projecting metal substrates, nonmetal substrates, and metal coating layers (i.e., coating layers formed through coatings on metal substrates). The easy-to-clean protective film provided by the present utility model is particularly suitable for being attached to the vehicle body surfaces, such as automobiles, motorcycles, high-speed railway cars, and subway cars.

Figure 1:
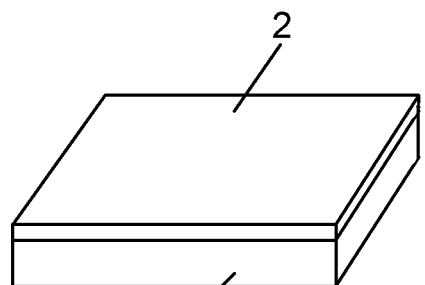
FIG. 1 illustrates a structural schematic view of an easy-to-clean protective film according to embodiment 1 of the present utility model.

In the drawings, the reference numerals include the following: 1. PVC bottom film; 2. easy-to-clean layer; 3. bonding layer; 4. pressure-sensitive adhesive layer; and 5. release layer.

DETAILED DESCRIPTION

In order to enable those skilled in the art to better understand the technical solution of the present utility model, the present utility model will be further described below in details with reference to the drawings and in combination with the specific embodiments.

For details of raw materials and instrument information in the following embodiments, see Table 1. It should be noted that the raw materials in the following embodiments are commercially available. When similar commercially available raw materials of other suppliers or with other names of commodities are adopted, the experimental results are similar to those of the present utility model.

TABLE 1

| Raw material or instrument | Name of commodity | Supplier |
|---|---|---|
| Polyurethane solution containing Sn catalyst with solid content of 73 wt % | Polyurethane solution | 3M |
| Dispersion of silicon dioxide with solid content of 5 wt % | Silicon dioxide solution | 3M |
| PVC cast film | 3699 | 3M |
| Composite protective film of paint and PU | Xpel Lux | Xpel |
| PVC film | 8519 | 3M |
| Composite protective film of fluororubber/acrylic resin coating | 8528 | 3M |
| High-gloss solvent-based coating coated to aluminum plate | Nil | Lankwitzer (Beijing) Coatings Science and Technology Co., Ltd. |
| Dust stains | GSB 08-2992-2013 | Shanghai Research Institute of Building Science (Group) Co., Ltd. |
| Oil stains | GTX SN 10W-40 | Castrol APL |
| Lubricating grease | MP | Mobil |
| Contact angle testing instrument | DSA 100 | Kruss |
| Corona treatment instrument | DY-2 | Shanghai Haohua Electronic Science and Technology Co., Ltd. |
| Cleaning machine | Gardner-scrub 5060 | BYK |
| Cleaning agent | VC-1C | Shanghai Jibiao Chemical Co., Ltd. |
| Gloss Testing Instrument | Gardner GmbH miro-TRI-gloss | BYK |
| Colorimeter | SpectroEye | X-rite |

Embodiment 1

This embodiment provides an easy-to-clean protective film. As illustrated in FIG. 1, the easy-to-clean protective film includes a PVC bottom film 1 for protecting metal substrates, non-metal substrates, or metal coating layers and an easy-to-clean layer 2 (also referred to as a silicon dioxide layer) consisting of silicon dioxide particles. Herein, a transparent PVC cast film may be used as the PVC bottom film 1, so as not to affect the color and brightness of the metal coating layer itself.

When the easy-to-clean protective film is used, the PVC bottom film 1 is attached to the metal coating layer; and the easy-to-clean layer 2 is exposed to the environmental surface. Since the easy-to-clean layer 2 consists of silicon dioxide particles having a small water contact angle, the adhesive force of dust and oil stains can be reduced. When the surface of the easy-to-clean layer 2 is contaminated with dust and oil stains, the dust and oil stains can be cleaned with a simple cleaning.

Embodiment 2

Figure 2:
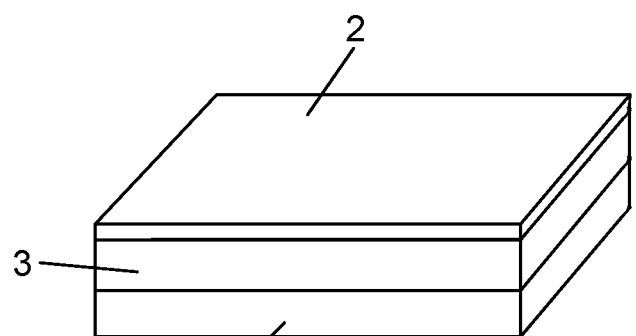
FIG. 2 illustrates a structural schematic view of an easy-to-clean protective film according to embodiment 2 of the present utility model.

This embodiment provides an easy-to-clean protective film. As illustrated in FIG. 2, the easy-to-clean protective film includes a PVC bottom film 1 used for protecting metal substrates, non-metal substrates, or metal coating layers, and an easy-to-clean layer 2 consisting of silicon dioxide particles. A bonding layer 3 consisting of polyurethane (PU) (also referred to as a polyurethane layer) is arranged between the PVC bottom film 1 and the easy-to-clean layer 2 to enhance the bonding force therebetween. Herein, the raw materials of the PVC bottom film 1, the silicon dioxide layer, and the polyurethane layer in this embodiment are all commercially available.

In the long-term use of the easy-to-clean protective film provided by embodiment 1, especially after repeated rinsing, rubbing, and cleaning, the silicon dioxide particles of the easy-to-clean layer 2 are at risk of coming off. In order to reduce this risk and increase the service life of the easy-to-clean protective film, a bonding layer 3 consisting of polyurethane is added between the PVC bottom film 1 and the easy-to-clean layer 2 in embodiment 2. The binding layer 3 not only has good binding ability with the PVC bottom film 1, it can also securely lock the silicon dioxide particles.

Preferably, the PVC bottom film 1 has a thickness of from 50 μm to 100 μm.

Herein, if the thickness of the PVC bottom film 1 is less than 50 μm, it is too thin to protect a metal coating layer. If the thickness of the PVC bottom film 1, on the other hand, is more than 100 μm, it is too thick to be adhered to the metal coating layer.

Preferably, the bonding layer 3 has a thickness of from 5 μm to 75 μm.

Herein, if the thickness of the bonding layer 3 is less than 5 μm, it will be difficult to coat because of the deviation in thickness uniformity of PVC bottom film 1 itself; and if the thickness of the bonding layer 3, on the other hand, is more than 75 μm, it will increase the overall thickness of the product, which is adversely affecting the adhesion with a metal substrate, a nonmetal substrate, or a metal coating layer. Further, the increase of thickness also increases the product cost.

Preferably, the thickness of the easy-to-clean layer 2 has a thickness of from 150 nm to 1 μm. Herein, if the thickness of the easy-to-clean layer 2 is less than 150 nm, the easy-to-clean effect becomes poor; and if the thickness of the easy-to-clean layer 2 is more than 1 μm, the appearance of the product will be affected, resulting in cracking of the easy-to-clean protective film, which in turn gives rise to defects.

Preferably, the silicon dioxide particles has a particle size of from 2 nm to 100 nm. Herein, the thickness of the easy-to-clean layer 2 directly affects the difficulty in cleaning and cleaning effect of the product. Preferably, the particle size of the silicon dioxide particles is from 2 nm to 10 nm. When the particle size of the silicon dioxide particles is 2 nm, the water contact angle of the surface of the easy-to-clean layer 2 is small with higher roughness, leading to a smaller adhesive force of dust and oil stains thereon, which is beneficial to cleaning.

Alternatively, a pressure-sensitive adhesive layer 4 is arranged on a side, far from the easy-to-clean layer 2, of the PVC bottom film 1, and is used for bonding the easy-to-clean protective film onto the surface of the metal coating layer. Preferably, a release layer 5 is further arranged on a side, far from the PVC bottom film 1, of the pressure-sensitive adhesive layer 4.

Figure 3:
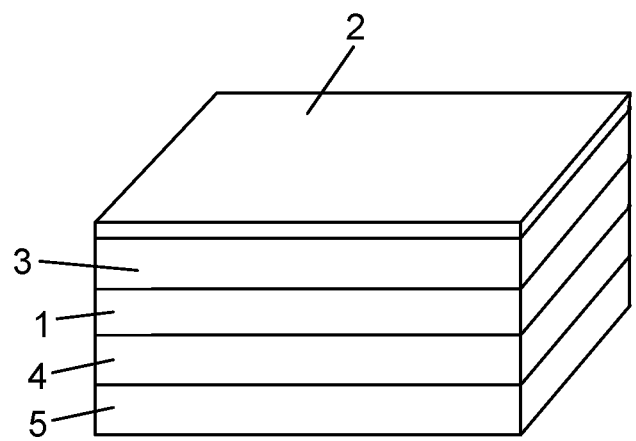
FIG. 3 illustrates a structural schematic view of an easy-to-clean protective film according to embodiment 2 of the present utility model.

In short, as illustrated in FIG. 3, in mass production of the easy-to-clean protective film product, the pressure-sensitive adhesive layer 4 can be bonded directly onto one side, far away from the easy-to-clean layer 2, of the PVC bottom film 1. Before use, a release layer 5 is attached to the pressure-sensitive adhesive layer 4. When in use, the release layer 5 can be torn off and the pressure-sensitive adhesive layer 4 can be bonded onto the surface of the metal coating layer.

Embodiment 3

This embodiment provides a method for preparing an easy-to-clean protective film, including the following steps:

(1) Polyurethane solution containing Sn catalyst was coated on the surface of a transparent PVC cast film, and curing was performed for 3.5 min to 5 min at 110-120° C. to form a polyurethane layer, i.e., a bonding layer. Then, corona treatment was performed under a condition of 200 mj/cm$^2$.

(2) The polyurethane layer was coated with silicon dioxide dispersion, and curing was performed for 3.5 min to 5 min at 110-120° C. to form a silicon dioxide layer, i.e., an easy-to-clean layer.

Cleaning Performance Test:

This test method (1) evaluated the anti-dust performance of samples by examining the gloss of the samples before and after contaminated with dust stains; (2) evaluated the oil stain cleaning effect of the samples by examining the gloss and differences in color of the samples before contaminated with oil stains and after cleaned.

Test A: Anti-Dust Performance

The gloss G1 of the samples before contaminated was measured by using a gloss testing instrument; then the samples were covered with dry dust stains; and the gloss G2 of the samples after contaminated was measured by using the gloss testing instrument.

The gloss change rate G=(G1−G2)/G1*100% was calculated. A smaller G value indicates the smaller gloss change after contamination, which in turn shows a better anti-ash performance.

Test B: Oil Stain Cleaning Effect

The gloss H1 of the samples before contaminated was measured by using a gloss testing instrument; and then the samples were covered with oil stains. The samples were cleaned using the aqueous solution of a cleaning agent in a cleaning machine; and the gloss H2 of the samples after being cleaned was measured by using the gloss testing instrument.

The gloss change rate H=(H1−H2)/H1*100% was calculated. A smaller H value indicates the smaller gloss change, which in turn shows a better cleaning effect.

The differences in color (L, a, b) of the samples before contaminated and the differences in color (L', a', b') after contaminated and cleaned by adopting the above-mentioned method were measured by using a colorimeter, and calculation was performed as follows:

$$\mathrm{Delta}E=((L-L')^2+(a-a')^2+(b-b')^2)^{1/2}$$

A smaller Delta E value means that it is easier to clean.

Sample 1: according to the preparation method provided by embodiment 3, an easy-to-clean protective film with a structure as described in embodiment 2 was prepared. Specifically, the thickness of the PVC cast film was 50 μm; the thickness of the polyurethane layer was 30 μm; the thickness of the silicon dioxide layer was 260 nm; and the particle size of the silicon dioxide particles was 2 nm.

Sample 2: according to the preparation method provided by embodiment 3, an easy-to-clean protective film with a structure as described in embodiment 2 was prepared. Specifically, the thickness of the PVC cast film was 100 μm; the thickness of the polyurethane layer was 5 μm; the thickness of the easy-to-clean layer was 150 nm; and the particle size of the silicon dioxide particles was 2 nm.

Sample 3: according to the preparation method provided by embodiment 3, an easy-to-clean protective film with a structure as described in embodiment 2 was prepared. Specifically, the thickness of the PVC cast film was 80 μm; the thickness of the polyurethane layer was 75 μm; the thickness of the easy-to-clean layer was 100 nm; and the particle size of the silicon dioxide particles was 2 nm.

Sample 4: commercially available composite protective film of paint and PU (name of commodity: Xpel Lux).

Sample 5: composite protective film of transparent PVC film and fluororubber (KelF)/acrylic resin paint (name of commodity: 8528).

Sample 6: transparent PVC film (name of commodity: 8519).

Sample 7: high-gloss solvent-based coating coated onto an aluminum plate.

Samples 1-7 were tested respectively according to the cleaning performance test method disclosed by the present utility model. The results of the anti-dust performance test are shown in Table 2. The results of the oil stain cleaning test are shown in Table 3.

TABLE 2

| | Gloss | | |
| --- | --- | --- | --- |
| | Before contaminated G1 | After contaminated G2 | Change rate G |
| Sample 1 | 85 | 50.3 | 40.8% |
| Sample 2 | 85.3 | 34 | 60.1% |
| Sample 3 | 82.5 | 32.3 | 60.8% |
| Sample 4 | 94.1 | 56.8 | 39.6% |
| Sample 5 | 87.3 | 4 | 95.4% |
| Sample 6 | 89.4 | 38.6 | 56.8% |
| Sample 7 | 95.1 | 10.3 | 89.2% |

TABLE 3

| | Gloss | | | Differences in color | | |
| --- | --- | --- | --- | --- | --- | --- |
| | Before contaminated H1 | After cleaned H2 | Change rate H | Before contaminated (L, a, b) | After cleaned (L', a', b') | Delta E |
| Sample 1 | 85 | 67.4 | 20.7% | (94.67, −1.23, 0.31) | (92.01, −0.33, 1.35) | 3.0 |
| Sample 2 | 85.3 | 53.2 | 37.6% | (94.96, −1.39, 0.07) | (89.65, 1.76, 2.66) | 6.7 |
| Sample 3 | 82.5 | 51.5 | 37.5% | (94.76, −1.22, 0.3) | (87.34, 1.78, 2.62) | 8.3 |
| Sample 4 | 94.1 | 55.3 | 41.2% | (84.64, −0.48, 3.11) | (81.46, 1.59, 4.58) | 4.1 |
| Sample 5 | 87.3 | 51.2 | 41.3% | (93.55, −1.7, 2.25) | (88.31, 1.68, 4.54) | 6.6 |
| Sample 6 | 89.4 | 42.6 | 52.3% | (93.1, −1.69, 0.45) | (85.99, 2.68, 3.85) | 9.0 |
| Sample 7 | 95.1 | 62.1 | 34.7% | (86.88, 0.16, 3.11) | (84.6, 1.51, 4.28) | 2.9 |

The above cleaning performance test data shows that the easy-to-clean protective film disclosed by the present utility model has better anti-dust performance; and after contaminated with oil stains, the surface of the easy-to-clean protective film can be restored as before with a simple cleaning. The thickness of the easy-to-clean layer has a certain influence on the cleaning effect.

Bonding Ability Test of Silicon Dioxide Layer:

Sample 8: a transparent PVC cast film was subjected to corona treatment under a condition of 200 mj/cm$^2$; and then a silicon dioxide layer was formed on the surface of the transparent PVC cast film. Herein, the thickness of the PVC cast film was 50 μm; the thickness of the silicon dioxide layer was 200 nm; and the particle size of silicon dioxide was 2 nm.

Sample 9: a polyurethane layer was formed on a transparent PVC cast film, and then a silicon dioxide layer was formed. Herein, the thickness of the PVC cast film was 50 μm; the thickness of the polyurethane layer was 30 μm; the thickness of the silicon dioxide layer was 260 nm; and the particle size of silicon dioxide was 2 nm.

Sample 10: according to the preparation method provided by embodiment 3, an easy-to-clean protective film with a structure as described in embodiment 2 was prepared. Herein, the thickness of the PVC cast film was 50 μm; the thickness of the polyurethane layer was 30 μm; the thickness of the silicon dioxide layer was 360 nm; and the particle size of silicon dioxide was 2 nm.

A contact angle measuring instrument was used to first measure the initial contact angles of samples 8-10 respectively; and then cotton cloths were used to respectively rub samples 8-10 for 100 times, 200 times, 300 times, and 1000 times. The contact angles was measured after 1000 times, and the experiments results are shown in Table 4.

TABLE 4

|  | Initial contact angle | After being rubbed for 100 times | After being rubbed for 200 times | After being rubbed for 300 times | After being rubbed for 1000 times |
| --- | --- | --- | --- | --- | --- |
| Sample 8 | 32-39 | 76-81 | — | — | — |
| Sample 9 | 31-32 | 19-20 | 57-62 | — | — |
| Sample 10 | 32-33 | 36-37 | 22-24 | 14-15 | 21-23 |

The symbol "---" for sample 8 in Table 4 means that, after the sample was rubbed for 100 times, the contact angle increased significantly; and the coating effect of the product failed. No further rubbing test was needed. For sample 9, the symbol "---" has the similar meaning.

The above test data indicates that the bonding ability of the silicon dioxide layer of sample 10 is the best. By arranging a bonding layer consisting of polyurethane between the PVC film and the silicon dioxide layer, the silicon dioxide particles can be prevented from coming off after the easy-to-clean protective film is repeatedly rinsing, rubbing, and cleaning, thereby increasing the service life of the easy-to-clean protective film.

Embodiment 4

This embodiment provides a substrate assembly, comprising a substrate having arranged thereon a coating layer formed through coating. The easy-to-clean protective film according to the above-mentioned embodiment is attached to the coating layer.

Embodiment 5

This embodiment provides a substrate assembly, comprising a substrate having the easy-to-clean protective film according to the above-mentioned embodiment attached thereon.

Specifically, the substrates in embodiment 4 and 5 may be made of metal materials or other non-metallic materials; and more specifically, the substrates may be the bodies of vehicles such as automobiles, motorcycles, high-speed railway cars, and subway cars. The substrates may also be other substrates exposed to and used in unclean environments.

Herein, after the surfaces of the substrate assemblies in embodiment 4 and 5 are contaminated with dust and oil stains, the dust and oil stains can be cleaned with a simple cleaning.

Obviously, the specific implementations of the above-mentioned embodiments may also be modified. For example, the thickness of the easy-to-clean layer and the bonding layer may be adjusted according to the needs; and the specific materials of the bonding layer may be selected according to the actual products.

It can be understood that the above-mentioned embodiments are only exemplary embodiments for describing the principles of the present utility model. The present utility model, however, is not limited thereto. One skilled in the art may make various modifications and improvements without departing from the spirit and essence of the present utility model. These modifications and improvements are also deemed as falling within the protection scope of the present utility model.

The invention claimed is:

1. An easy-to-clean protective film, wherein the easy-to-clean protective film comprises a polyvinyl chloride bottom film and a separate easy-to-clean layer consisting of silicon dioxide particles on a side of the polyvinyl chloride bottom film, wherein an initial water contact angle of the easy-to-clean layer is less than or equal to 39 degrees.

2. The easy-to-clean protective film according to claim 1, wherein the polyvinyl chloride bottom film has a thickness of from 50 μm to 100 μm.

3. The easy-to-clean protective film according to claim 1, wherein the easy-to-clean layer has a thickness of from 150 nm to 1 μm.

4. The easy-to-clean protective film according to claim 1, wherein the silicon dioxide particle has a particle size of from 2 nm to 100 nm.

5. The easy-to-clean protective film according to claim 4, wherein the silicon dioxide particle has a particle size of from 2 nm to 10 nm.

6. The easy-to-clean protective film according to claim 1, wherein a bonding layer is further arranged between the polyvinyl chloride bottom film and the easy-to-clean layer, and the polyvinyl chloride bottom film and the easy-to-clean layer are bonded together through the bonding layer.

7. The easy-to-clean protective film according to claim 6, wherein the bonding layer consists of polyurethane.

8. The easy-to-clean protective film according to claim 6, wherein the bonding layer has a thickness of from 5 μm to 75 μm.

9. The easy-to-clean protective film according to claim 1, wherein a pressure-sensitive adhesive layer is arranged on a side, far away from the easy-to-clean layer, of the polyvinyl chloride bottom film.

10. The easy-to-clean protective film according to claim 9, wherein a release layer is further arranged on a side, far away from the polyvinyl chlorine bottom film, of the pressure-sensitive adhesive layer.

11. A substrate assembly, comprising a substrate having arranged thereon a coating layer formed through coating, wherein the easy-to-clean protective film according to claim 1 is attached to the coating layer.

12. A substrate assembly, comprising a substrate having the easy-to-clean protective film according to claim 1 attached thereon.

* * * * *